United States Patent
Cahill et al.

(10) Patent No.: US 6,296,423 B1
(45) Date of Patent: *Oct. 2, 2001

(54) ARTICLE HANDLING APPARATUS

(75) Inventors: Michael John Cahill; Simon Charles Martin; James Robert Stembridge, all of Coventry (GB)

(73) Assignee: Lipton, Division of Conopco, Inc., Englewood Cliffs, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,963

(22) Filed: Mar. 17, 1998

(30) Foreign Application Priority Data

Mar. 19, 1997 (EP) .................................. 97301861

(51) Int. Cl.[7] .................................. B65G 53/48
(52) U.S. Cl. .............................. 406/70
(58) Field of Search .............. 406/28, 52, 70; 198/419.1, 463.4, 532

(56) References Cited

U.S. PATENT DOCUMENTS

| | | | | |
|---|---|---|---|---|
| 1,065,924 | * | 7/1913 | Dixon | 406/70 |
| 3,807,807 | | 4/1974 | Boon | 302/42 |
| 3,815,763 | * | 6/1974 | Biloco et al. | 198/532 |
| 4,124,128 | | 11/1978 | Adams et al. | |
| 4,143,753 | * | 3/1979 | Bergens | 198/369.1 |
| 4,660,352 | | 4/1987 | Deines et al. | |
| 5,156,499 | | 10/1992 | Miklich | |
| 5,333,721 | | 8/1994 | Stevie | |
| 5,603,398 | * | 2/1997 | Crouch | 198/419.1 |

FOREIGN PATENT DOCUMENTS

| | | |
|---|---|---|
| 186 255 | 11/1906 | (DE) . |
| 234 408 | 8/1910 | (DE) . |
| 588 260 | 6/1931 | (DE) . |
| 12 71 036 | 8/1968 | (DE) . |
| 1294883 | 5/1969 | (DE) . |
| 35 07 656 A1 | 5/1985 | (DE) . |
| 35 37 656 A1 | 9/1986 | (DE) . |
| 0 396 216 B1 | 9/1993 | (EP) . |

* cited by examiner

Primary Examiner—Joseph E. Valenza
(74) Attorney, Agent, or Firm—James J. Farrell

(57) ABSTRACT

An apparatus for batching articles from a continuous stream of articles has a conduit comprising an entry duct (2) in which the articles are accelerated by suction. The suction air is drawn from the exit end of the duct, close to a pair of counter-rotating sealing rollers (20) which have resiliently yielding peripheral faces between which the articles pass. At the exit end of the conduit a pair of closure members (24) on opposite sides of the conduit are rotatable in 90° steps in order to collect the articles in batches. The closure members counter-rotate so that in each step they move in the general direction of movement of the articles. In this way it is possible to batch relatively delicate articles at high rates of throughflow.

12 Claims, 4 Drawing Sheets

ARTICLE HANDLING APPARATUS

Figure 1:
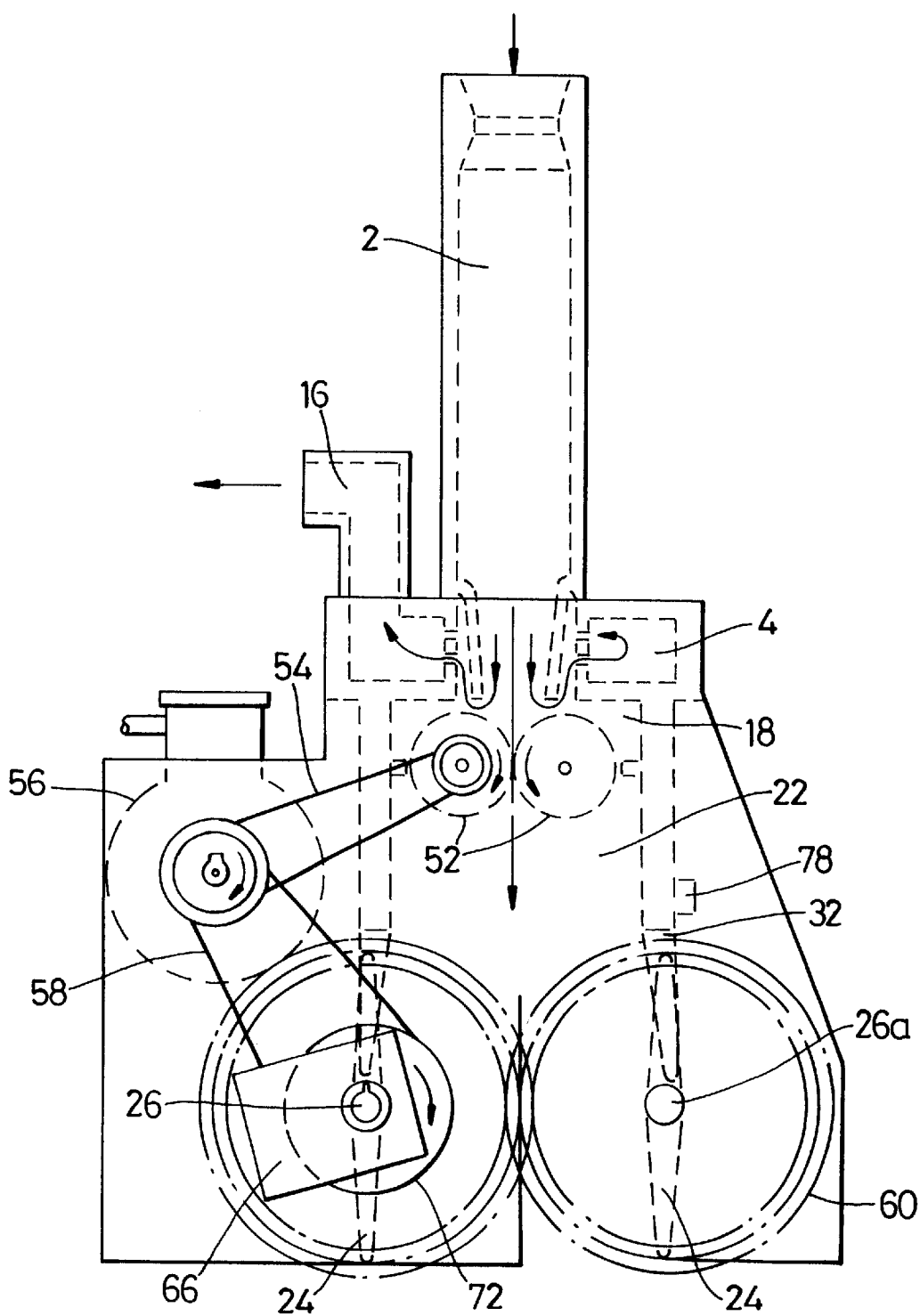

This invention relates to the handling of a series of individual articles, eg. to control the movement of the articles or to collect batches of the articles.

In one of its aspects, the invention is concerned with the batching of articles that are being manufactured at high production rates. In particular if the articles are relatively fragile it can be difficult to collect them in batches of predetermined quantities as they emerge from the production process, eg. for weighing and/or packaging.

According to this aspect of the invention, apparatus is provided for releasing articles in batches comprising a conduit having an exit provided with a closure gate rotatable to open and close the conduit, characterised in that said gate comprises at least one closure member mounted on a rotary axis at or adjacent a side wall of the conduit to be rotatable about said axis generally in the direction of movement of the articles through the conduit to a position extending across the conduit to close the exit for the articles, and is further rotatable in the same direction from said closing position to open the exit.

Preferably there is a pair of closure members arranged side by side at the exit passage and rotatable in opposite directions to each other for said opening and closing of the exit.

The closure member or members can thus be employed to temporarily cut off the flow of articles when a predetermined batch has been counted through. By using one or more rotatable members as a gate to stop the flow of articles from the conduit it is possible to handle a continuous stream of articles and to batch predetermined quantities of articles from that stream. As soon as the required number of articles has been dispensed, the conduit exit can be closed by the gate while the batch of articles is transferred away or is weighed or subjected to other tests, the continuing stream of articles arriving meanwhile being accumulated at the gate. It is only necessary to ensure that each batch has moved on further in time to accommodate the following batch.

By rotating the or each closure member so that as the gate opens it moves in generally the same direction as the travel direction of the articles, the accumulated articles can be cleared from the gate rapidly as it is opened. Also, if the or each member moves in the same direction to close the gate its motion can be more easily timed to synchronise with brief intervals between the arrival of successive articles, in order to avoid the risk of trapping articles during the closure of the gate.

A further problem associated with handling articles being manufactured at high rates of production is that, while it may be desirable to accelerate their progress along a travel path, the rate of acceleration may be limited by the need to protect the articles from damage. This is particularly so when handling a stream of relatively fragile, low density articles. In a continuous or line process for the manufacture or other processing of the articles such considerations can restrict the rate of operation because it becomes difficult to handle the articles at a fast enough rate, for example to batch the articles in predetermined quantities.

According to another aspect of the invention, apparatus is provided for accelerating the movement of articles along a duct comprising a chamber into which an exit end of the duct extends, a suction connection leading from the chamber to promote a gas flow along the duct, gas sealing means in the chamber adjacent the exit end of the duct between said exit end and an article outlet end of the chamber, said sealing means comprising counter-rotating rollers at least partially sealing said chamber outlet end to limit gas flow into the chamber from said end, at least one of said rollers having a yielding periphery to permit the articles to pass between the rollers by deforming said yielding periphery or peripheries, the conduit in the chamber being open substantially only at its exit end and at least one gas extraction opening is provided upstream of the duct exit end.

By arranging that the gas extraction from the duct occurs only at the exit and not at locations along the length of the duct it is possible to avoid the risk, in particular for low density articles, that the suction effect at such locations will hold articles there, and it also ensures that the entraining suction flow is maintained along the length of the duct.

Figure 3:
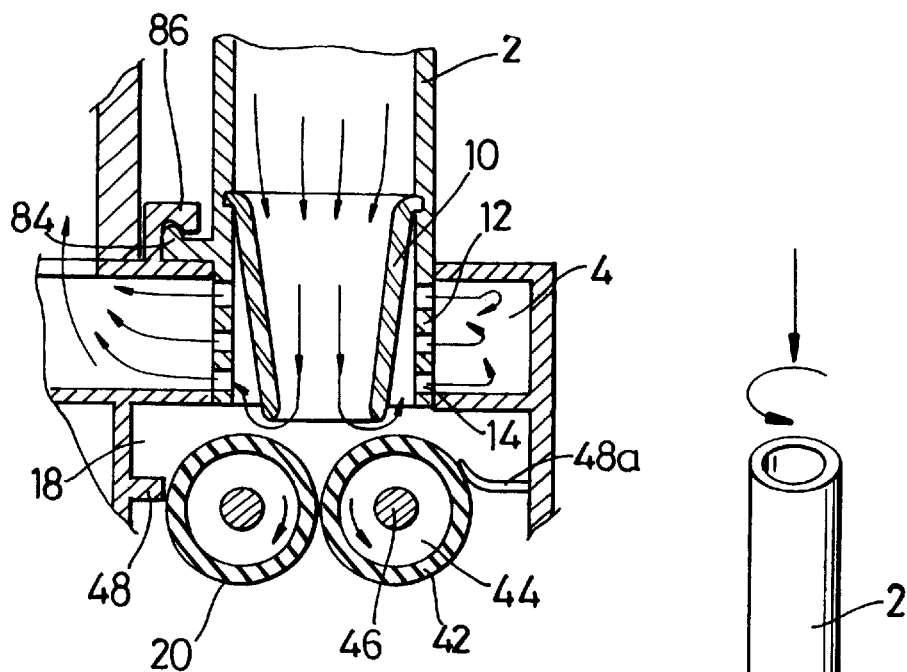
Figure 2:
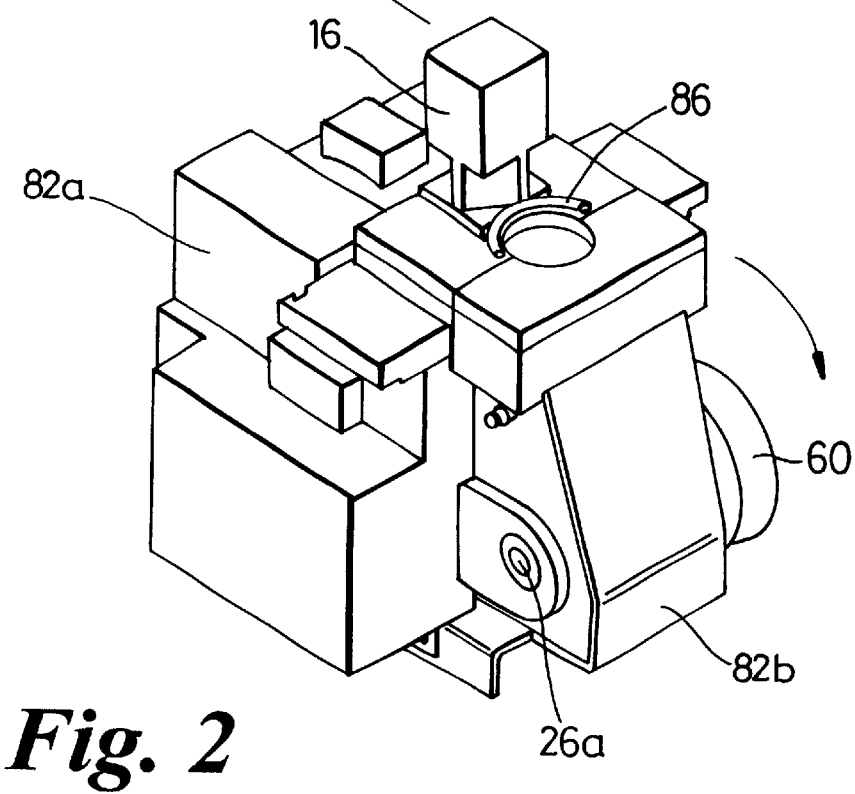
Figure 7:
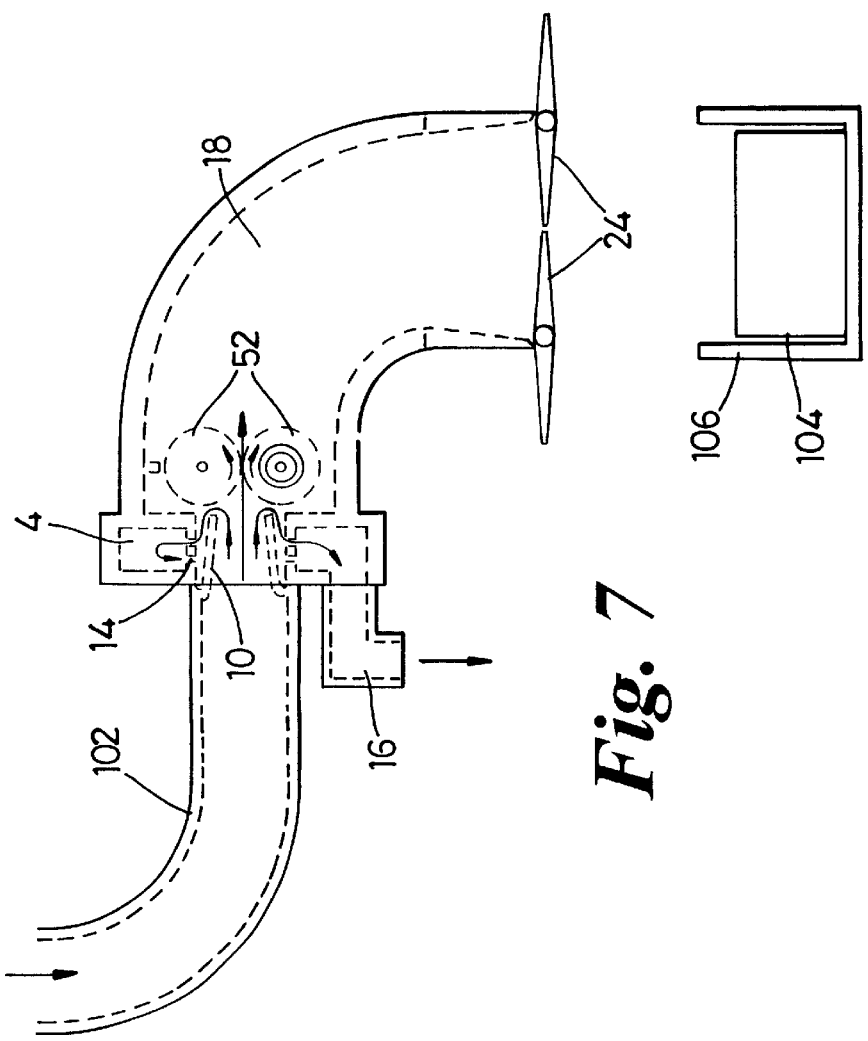
Figure 4:
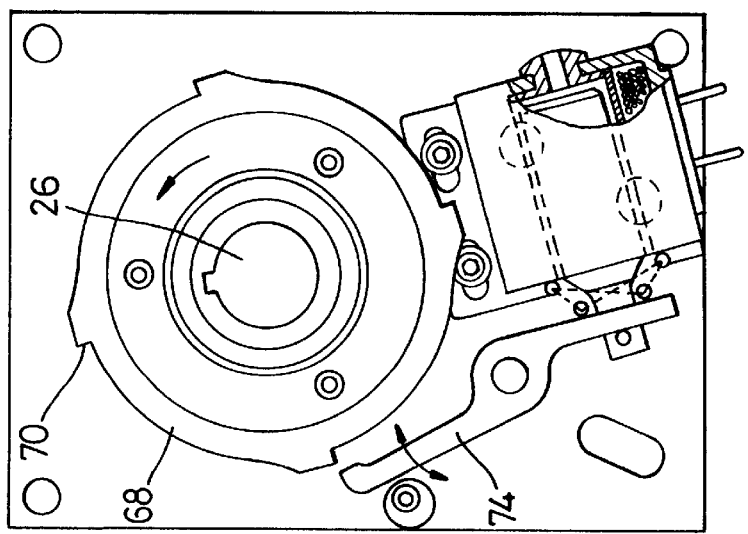
Figure 6:
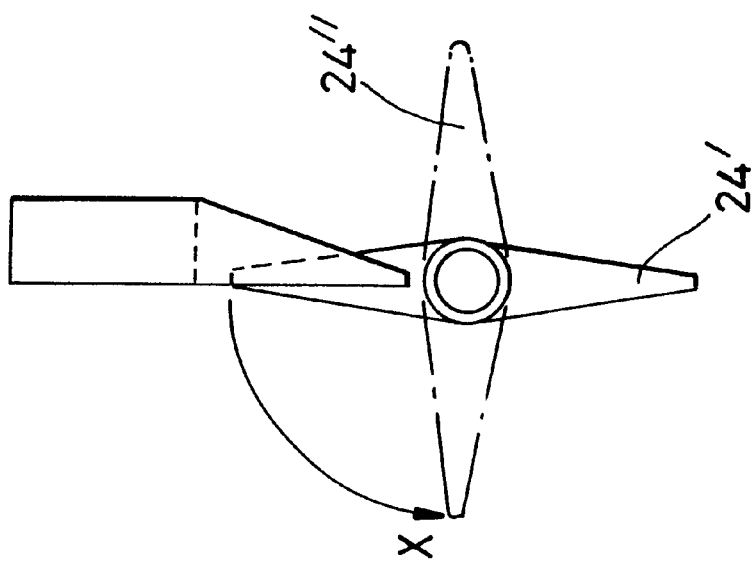
Figure 5:
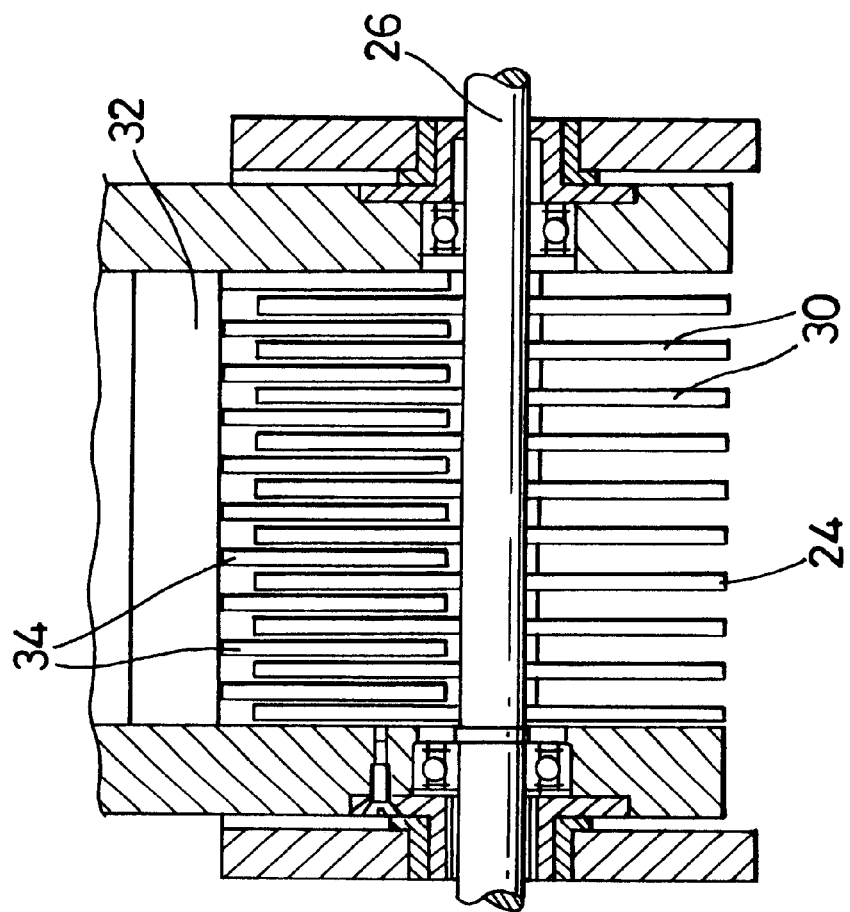

The invention will be described by way of example with reference to the accompanying diagrammatic drawings, in which:

FIG. 1 is a schematic side view of one form of apparatus according to the invention, FIG. 2 is an oblique view of the apparatus of FIG. 1 with the entry tube detached, FIG. 3 is a detail sectional side view of the suction chamber of the apparatus, FIG. 4 is a side view of the wrap spring clutch employed in the apparatus, FIGS. 5 and 6 are detail front and side views of a comb plate and an adjacent section of the exit chamber wall at the bottom of the conduit, and FIG. 7 is a schematic side view of a modified form of apparatus according to the invention.

The apparatus illustrated in FIGS. 1 and 2 of the drawings is intended to be positioned between a vertical flow-fill apparatus (not shown) which delivers a stream of articles into the top entry of a tube 2 forming the entry duct of a vertical conduit through the apparatus, and a conveyor (not shown) which lies below the bottom of the conduit. The flow-fill apparatus and the conveyor can each be of conventional design and do not need to be described further. They may be replaced by other apparatus and devices if desired, for example a weighing hopper can be placed below the conduit exit.

The tube 2 leads downwards through a suction chamber 4 which forms an annulus around a lower region of the tube. At its lower end the tube has double walls 10,12 (FIG. 3), the space between the inner and outer walls 10,12 being open at the bottom. Holes 14 in the outer wall 12 of the double-walled region open into the suction chamber 4 and the chamber has a coupling 16 for connection to a vacuum source (not shown). The conduit is continued below the tube 2 by a sealing chamber 18 the lower end of which is defined by two counter-rotating rollers 20 are mounted symmetrically with respect to the central axis of the conduit. Below the sealing chamber 18 the conduit terminates in an exit chamber 22.

The function of the suction chamber 4 is to produce a downward air flow in the tube 2, accelerating a stream of articles entering the upper end of the conduit. The sealing chamber 18 substantially reduces any flow of air upwards into the suction chamber, in order to ensure that the suction generates a downward flow in the tube 2 that is not unduly weakened by leakage from below. Because the holes 14 through which air is drawn into the suction chamber are not in the conduit, the suction flow through the tube is maintained to its outlet immediately adjacent the rollers 20. Furthermore there is no risk that articles will attach themselves to the outer wall 12 because of the suction force through the holes 14.

The downwards force generated by the air flow through the tube can assist the separation of the individual articles as the form-fill process is completed and the articles are sealed and severed, eg. by the action of heat if they comprise a thermoplastic material, from the continuous tube from which they are formed. The acceleration also increases the separation space between successive articles so facilitating subsequent operations.

The use of a suction flow to accelerate the articles has an incidental advantage in that dust will be drawn off with the flow. When packaging infusion materials such as tea smaller particles of the infusion material can appear as loose dust and the nuisance of this can therefore be avoided or lessened.

At the bottom outlet from the exit chamber 22, a pair of opposed comb plates 24 are rotatable on parallel shafts 26,26*a* to form a closure gate. From the central shaft of each comb plate corresponding sets of parallel teeth 30 project in diametrically opposite directions. The comb plates 24 are shown in a vertical position in FIG. 1, in which they leave the outlet of the exit chamber open. In FIG. 6 the comb plate is shown in full lines in this position, indicated by the reference 24', and is shown in phantom lines and indicated by the reference 24" in a position in which it forms a barrier across the outlet. Side walls 32 of the exit chamber extending upwards from close to the comb plate shafts 28 are slotted to form a series of fins 34 (FIG. 5) which allow free passage for the comb plates as these are rotated on their mountings through the vertical position.

The rollers 20 in the sealing chamber 18 have a hollow construction with a soft resilient outer cylindrical wall of silicone rubber 42 (FIG. 3) mounted by disc-form end walls 44 onto a rotary shaft 46 and are set at a small spacing from each other to allow free passage of articles between them without permitting an excessive leakage air flow. It is also possible to maintain the rollers in sealing engagement with each other if it can be ensured that articles falling through the conduit are able to deform the rollers sufficiently easily to pass freely between them. To reduce wear, the rollers 20 run at a clearance from the outer walls of the conduit. However, to restrict the leakage air paths between the cylindrical peripheries of the rollers and the opposite side walls of the conduit, barrier members project from these walls towards the rollers. FIG. 3 shows a one barrier member 48 in the form of a rigid bar extending close to but not contacting the adjacent roller. On the other side of the chamber in FIG. 3 an alternative barrier member 48*a* is shown formed from a series of flexible fingers making light sealing contact with its roller. This alternative member 48*a* has the advantage that it can provide an equally effective seal after the roller has worn, possibly unevenly, after long use.

At the ends of the rollers 20 it is possible to obtain a satisfactory degree of sealing by relying on a free running fit between the rollers and the chamber walls, especially as the leakage past the clearance is lessened by the fact that the restriction of the air flow paths is more extensive than at the peripheries of the rollers.

The rollers 20 are coupled together by toothed gears 52 to rotate synchronously in opposite directions. In particular, if they run in contact with each other, this ensures that they do not impose friction or torque on each other that might accelerate wear of the resilient peripheral walls 42.

The rollers are driven by a belt drive 54 from a constant speed motor 56. A further belt drive 58 from the motor 56 drives the gate comb plates 24 which are similarly coupled together by toothed gears 60 to rotate synchronously in opposite directions. The comb plates move in 90° steps between the vertical and horizontal positions shown in FIGS. 6, for which purpose they are driven through a "CB6 Super" wrap spring clutch 66 manufactured by Warner Electric Rotary Motion Division of Pitman, N.J.

The clutch 66 comprises a stop collar 68, (FIG. 4) having four equally spaced stop faces 70 for movement in 90° steps in known manner. Thus, the gate belt drive 58 applies a continuous rotation to a pulley 72 rotatably mounted on the shaft 26 of the rear comb plate 24. A solenoid-operated pawl 74 (FIG. 4) is engageable with the stop collar 68 of the clutch to hold it fixed, during which time the drive is not transmitted from the pulley 72 and both comb plates 24 are held braked. When the pawl 74 releases the stop collar 68 the brake imposed by the clutch 66 is released and the pulley drive is engaged with the shaft 26 of the rear comb plate to rotate the shaft and the stop collar 76 as one. Both comb plates of course rotate together in opposite directions and when a 90° rotation has been completed, the pawl 74 arrests the stop collar 68. The clutch then instantaneously brakes the comb plates and decouples them from the drive pulley 72.

Thus, with the comb plates 16 at the gate-open setting illustrated in FIG. 1 and 2, a first operation of the clutch will rotate the comb plates through 90° in the directions indicated by the arrows X in FIGS. 1 and 6 to close the gate. The next operation of the clutch will reopen the gate as the comb plates are rotated in the same direction through a further 90°, so that the comb plates in the path of the articles always move generally in the direction of movement of the articles. These steps are repeated in further operations of the clutch to alternately open and close the gate at the conduit exit.

In a preferred mode of operation of the apparatus, the comb plates 24 are normally held in their vertical positions, leaving open the outlet from the exit chamber 22 while a required number of articles are counted through the apparatus by conventional counter means (not shown), or by a timer if appropriate, and into whatever receiver (not shown) is provided for them below the conduit. At the end of the required count the comb plates are rotated to the horizontal position, so holding back further articles, while the batch of articles counted out is transferred away, and possibly weighed. Once the receiver has been cleared, eg. the receiving conveyor has moved on or the weighing hopper has been emptied, the comb plates rotate to open the gate again to release the first articles of the next batch which will have accumulated in the conduit in the meanwhile, and the gate is then kept open until the remainder of that batch have passed through.

In this manner fixed quantities of articles are delivered in batches, the size of the batch being adjustable by adjusting the period for which the gate is held open. In particular applications in which the weight of the batches of articles need not be checked, it is of course possible to dispense with the weighing hopper.

It has already been noted that the comb plates 24 move through the exit chamber in the general direction of movement of the articles, and the peripheral speed of the comb plates is preferably approximately equal to the speed of descent of the articles past them. By moving at a similar speed to the articles it can be ensured that the comb plates will not block the discharge of collected articles when the gate is opened and that they impose a precise cut off on the flow of articles from the apparatus when the gate is closed.

As a control measure, a sensor 78 (FIG. 1) is able to detect that the closure gate is in an open state. If the gate mechanism should malfunction, it is thereby possible to automatically stop the flow of articles into the apparatus by employing the sensor output to actuate means (not shown) for stopping the production of further articles or for diverting the flow of articles elsewhere.

While it is possible to employ other forms of intermittent drive to rotate the comb plates, the drive arrangement employing the wrap spring clutch 66 with a continuous input drive allows the gate to be opened and s closed extremely rapidly without risk of trapping articles between the comb plates, in particular when the flow is being stopped. The acceleration given to the articles by the suction acting in the tube 2 increases the separation of the articles and so makes it easier to close the gate in the interval between succeeding articles. Consequently, the apparatus can be employed with high rates of article throughflow, for example of the order of 90° articles per minute, delivering batches of ten articles at a time, without making it necessary to interrupt the passage of articles into the apparatus to count through each batch of articles accurately.

The rollers 20 preferably rotate at a speed similar to the speed of fall of the articles entering between the rollers. There is less risk of damage to delicate articles thereby and also, wear on the rollers is reduced. To avoid damage to delicate articles they are also arranged to be readily yieldable. In the illustrated example, the silicone rubber peripheral wall 42 may require support only at its ends by the rigid walls 44 fixed to the roller shafts 46. Alternatively, a roller can be provided which has a soft outer sleeve on a rigid or resilient inner core, or which has in place of such an inner core a volume of pressurised gas to support the sleeve resiliently.

Another consequence of gripping the articles between resiliently yieldable rollers is that compressible bulky articles that can be compacted to some extent for packaging are subjected to pressure from the rollers which is able to reduce their volume appreciably. For example, infusion packets frequently contain air immediately after manufacture which seeps away during handling and storage and it is an advantage to be able to expel as much of that contained air as possible before the packets are collected together in a carton or the like.

To allow easy access to the sealing chamber 18, whether for maintenance or for clearing blockages, the main casing of the apparatus is formed in two parts 82a,82b. (FIG. 2), the joint between them running diametrically across the casing of the suction and sealing chambers 4,18. The part 82a is fixed and the part 82b is pivotable on it about the axis of the shaft 26a. The two parts are held with mating faces butted together by quick-release clips (not shown). The tube 2 is a separate component located in the casing while the part 82b has been swung downwards, by rotating the tube to locate a spur 84 at its lower end under an arcuate lip 86 on the top face of the fixed casing part 82a. The tube is firmly gripped in this position when the casing parts 82a,82b are locked together again.

FIG. 7 illustrates a modified form of apparatus according to the invention in which parts which have already been described are indicated by the same reference numbers. The drawing indicates that the orientation of the path through the suction chamber can be varied if desired, and that it is possible to employ a longer suction tube 102 if it is required to deliver the batches of articles to a receiving location remote from the article-producing apparatus, such as to a container 104 on a conveyor 106. The drive arrangement for the rollers 20 and the comb plates 24 may be as already described.

What is claimed is:

1. Apparatus for releasing articles in batches comprising a conduit having an exit provided with a closure gate rotatable to open and close the conduit, said gate comprising at least one closure member mounted on a rotary axis at or adjacent a side wall of the conduit, drive means for rotating said at least one member about said axis generally in the direction of movement of the articles through the conduit, said drive means alternately moving said at least one member to a position extending across the conduit to close the exit for the articles, and by rotation in the same direction from said closing position, to a further position in which the exit is opened, further, comprising suction means in an article path leading to said conduit, and counter-rotating rollers at least partially sealing said path upstream of the closure gate, at least one of the rollers having a yieldable periphery to permit articles to pass between the rollers by deforming said periphery or peripheries.

2. Apparatus for accelerating the movement of articles along a duct comprising a sealing chamber into which an exit end to the duct extends, a suction connection to the chamber to promote a gas flow along the duct, gas sealing means at an outlet from the sealing chamber adjacent the exit end of the duct, said sealing means comprising counter-rotating rollers at least partially sealing said chamber outlet to limit gas flow into the chamber therefrom, at least one of said rollers having a yielding periphery to permit the articles to pass between the rollers by deforming said yielding periphery or peripheries, in the sealing chamber the duct being open substantially only at its exit end and the sealing chamber communicating with the suction connection through at least one gas extraction opening upstream of the duct exit end wherein the suction chamber is formed in two main casing parts, one of which is pivotable on the other to give access to the interior of the chamber.

3. Apparatus for releasing articles in batches comprising a conduit having an exit provided with a closure gate rotatable to open and close the conduit, an article path leading to said conduit and suction means for promoting a gas flow along said article path, counter-rotating rollers upstream of said gate at least partially sealing said path from the conduit exit, at least one of the rollers having a yieldable periphery to permit articles to pass between the rollers by deforming said periphery or peripheries, said gate comprising at least one closure member mounted on a rotary axis at or adjacent a side wall of the conduit to be rotatable about said axis generally in the direction of movement of the articles through the conduit to a position extending across the conduit to close the exit for the articles, and being further rotatable in the same direction from said closing position to open the exit.

4. Apparatus according to claim 3 wherein said at least one closure member is a substantially planar member.

5. Apparatus according to claim 3 wherein said at least one closure member is rotatable from a position substantially coplanar with an adjacent region of the conduit wall to said closing position.

6. Apparatus according to claim 3 wherein said at least one closure member comprises diametrically opposite elements symmetrically disposed with respect to the rotary axis, whereby the member is rotatable between opening and closing positions in equal 90° steps.

7. Apparatus according to claim 3 wherein said at least one closure member comprises a series of elements spaced along the rotary axis and extending outwardly therefrom, and an adjacent wall of the conduit leading to the closure gate comprises a series of spaced elements for interleaving with said elements of said closure member when the member is rotated.

8. Apparatus according to claim 3 comprising a pair of said rotary closure members mounted on rotary axes at or adjacent opposite side walls of the conduit, and means for rotating the members together in opposite directions to open and close the exit jointly.

9. Apparatus according to claim 3 wherein the conduit provides a downwardly directed path for the articles released by the opening of the closure gate.

10. Apparatus for accelerating the movement of articles along a duct comprising a sealing chamber into which an exit end of the duct extends, a suction connection to the chamber to promote a gas flow along the duct, the suction chamber being formed in two main casing parts, one of which is pivotable on the other to give access to the interior of the chamber, gas sealing means adjacent the exit end of the duct between said exit end and an article outlet, said sealing means comprising counter-rotating rollers at least partially sealing said chamber at said outlet to limit gas flow into the chamber from said outlet, at least one of the rollers having a yielding periphery to permit the articles to pass between the rollers by deforming said yielding periphery or peripheries, in the chamber the duct being open substantially only at its exit end and at least one gas extraction opening to said suction connection being provided upstream of the duct exit end.

11. Apparatus according to claim 10 wherein an outer peripheral wall surrounds the exit end region of the duct and is provided with a plurality of said extraction openings around its periphery.

12. Apparatus according to claim 10 wherein gas paths past the mutually remote peripheral faces of the rollers are sealed by respective series of resilient fingers bearing on said faces of the rollers.

* * * * *